US006990459B2

(12) United States Patent
Schneider

(10) Patent No.: US 6,990,459 B2
(45) Date of Patent: Jan. 24, 2006

(54) SYSTEM AND METHOD FOR DEVELOPING A FARM MANAGEMENT PLAN FOR PRODUCTION AGRICULTURE

(75) Inventor: Gary M. Schneider, Masonville, CO (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/934,257

(22) Filed: Aug. 21, 2001

(65) Prior Publication Data

US 2002/0103688 A1 Aug. 1, 2002

Related U.S. Application Data

(60) Provisional application No. 60/226,857, filed on Aug. 22, 2000.

(51) Int. Cl.
*G06F 17/60* (2006.01)

(52) U.S. Cl. .............................................. 705/8; 705/7
(58) Field of Classification Search .................... 705/8, 705/7; 702/5
See application file for complete search history.

(56) References Cited

U.S. PATENT DOCUMENTS

| 3,978,324 A | 8/1976 | Rayner |
| 4,015,366 A | 4/1977 | Hall, III |
| 4,016,542 A | 4/1977 | Azure |
| 4,176,395 A | 11/1979 | Evelyn-Veere et al. |
| 4,209,131 A | 6/1980 | Barash et al. |
| 4,244,022 A | 1/1981 | Kendall |
| RE31,023 E | 9/1982 | Hall, III |
| 4,420,682 A | 12/1983 | Huber |
| 4,430,828 A | 2/1984 | Oglevee et al. |
| 4,463,706 A | 8/1984 | Meister et al. |
| 4,493,290 A | 1/1985 | Gibbard |
| 4,617,876 A | 10/1986 | Hayes |
| 4,626,984 A | 12/1986 | Unruh et al. |
| 4,630,773 A | 12/1986 | Ortlip |
| 4,722,054 A | 1/1988 | Yorozu et al. |
| 4,745,550 A | 5/1988 | Witkin et al. |
| 4,755,942 A | 7/1988 | Gardner et al. |
| 4,760,547 A | 7/1988 | Duxbury |
| 4,876,643 A | 10/1989 | McNeill et al. |
| 4,931,932 A | 6/1990 | Dalnekoff et al. |
| 4,949,248 A | 8/1990 | Caro |
| 4,992,940 A | 2/1991 | Dworkin |
| 4,992,942 A | 2/1991 | Bauerle et al. |
| 4,996,645 A | 2/1991 | Schneyderberg Van Der Zon |

(Continued)

FOREIGN PATENT DOCUMENTS

| EP | 0 203 662 | 10/1989 |
| EP | 0 460 869 A2 | 12/1991 |
| JP | 411134398 A | * 5/1999 |
| WO | WO 98/58476 | 12/1998 |

OTHER PUBLICATIONS

Batte, M.T., Factors Influencing the Profitability of Precision Farming Systems, First Quarter 2000, Journal of Soil and Water Conservation, pp. 12–18, [PROQUEST].*

(Continued)

*Primary Examiner*—Tariq R. Hafiz
*Assistant Examiner*—Andre Boyce

(57) ABSTRACT

A system comprised of hardware, software and business processes for developing an optimal custom farm management plan, and in particular, a single year or multi-year crop selection, acreage allocation, and resource management strategies for production agriculture. The method uses mathematical programming and sensitivity analysis to help the user determine optimal allocations of controllable resources such as land, capital, labor, water, machinery, and chemicals in the context of farm management objectives. The system allows the import of data and information relating to the farm and data and information from third party industry professionals and sources, thereby providing for a complete analysis based on these parameters.

20 Claims, 13 Drawing Sheets

U.S. PATENT DOCUMENTS

| | | | |
|---|---|---|---|
| 5,107,443 A | 4/1991 | Smith et al. | |
| 5,023,787 A | 6/1991 | Evelyn-Veere | |
| 5,063,505 A | 11/1991 | Pate et al. | |
| 5,124,909 A | 6/1992 | Blakely et al. | |
| 5,136,501 A | 8/1992 | Silverman et al. | |
| 5,173,079 A | 12/1992 | Gerrish | |
| 5,173,855 A | 12/1992 | Nielsen et al. | |
| 5,220,876 A | 6/1993 | Monson et al. | |
| 5,246,164 A | 9/1993 | McCann et al. | |
| 5,287,453 A | 2/1994 | Roberts | |
| 5,297,195 A | 3/1994 | Thorne et al. | |
| 5,299,207 A | 3/1994 | Fujii | |
| 5,323,317 A | 6/1994 | Hampton et al. | |
| 5,327,708 A | 7/1994 | Gerrish | |
| 5,355,815 A | 10/1994 | Monson | |
| 5,379,057 A | 1/1995 | Clough et al. | |
| 5,453,924 A | 9/1995 | Monson et al. | |
| RE35,100 E | 11/1995 | Monson et al. | |
| 5,467,271 A * | 11/1995 | Abel et al. | 702/5 |
| 5,566,069 A | 10/1996 | Clark, Jr. et al. | |
| 5,689,418 A | 11/1997 | Monson | |
| 5,699,244 A | 12/1997 | Clark, Jr. et al. | |
| 5,701,400 A | 12/1997 | Amado | |
| 5,721,679 A | 2/1998 | Monson | |
| 5,751,576 A | 5/1998 | Monson | |
| 5,752,023 A | 5/1998 | Choucri et al. | |
| 5,757,640 A | 5/1998 | Monson | |
| 5,771,169 A * | 6/1998 | Wendte | 702/5 |
| 5,851,999 A | 12/1998 | Moriyama | |
| 5,859,972 A | 1/1999 | Subramaniam et al. | |
| 5,867,494 A | 2/1999 | Krishnaswamy et al. | |
| 5,867,495 A | 2/1999 | Elliott et al. | |
| 5,873,071 A | 2/1999 | Ferstenberg et al. | |
| 5,884,224 A | 3/1999 | McNabb et al. | |
| 5,884,225 A | 3/1999 | Allen et al. | |
| 5,884,226 A | 3/1999 | Anderson et al. | |
| 5,897,619 A * | 4/1999 | Hargrove et al. | 705/4 |
| 6,058,351 A * | 5/2000 | McCauley | 702/50 |
| 6,141,614 A * | 10/2000 | Janzen et al. | 701/50 |
| 6,327,569 B1 * | 12/2001 | Reep | 705/1 |
| 6,505,146 B1 * | 1/2003 | Blackmer | 702/189 |
| 2002/0023052 A1 * | 2/2002 | Remley et al. | 705/38 |
| 2003/0036852 A1 * | 2/2003 | Ell et al. | 702/5 |

OTHER PUBLICATIONS

Wilcox, J., Accounting on it (Use of Accounting Software in Managing Farms), Dec. 1997, Successful Farming, vol. 95 Issue 12, start p. 25, [DIALOG: File 47].*

Mangold, Grant, Farming with Precision, Dec. 1996, Successful Farming, vol. 94 Issue 12, start p. 40, [DIALOG: File 47].*

A General Purpose Tractor Instrumentation and Data Logging System (1993).

A Simple and Inexpensive System for Collection of Data at Remote Locations (1991).

AGRIS Precisions Agriculture Products Advertisement (copyright 1995, 1996).

An Investigation and Development of the Use if Hand Held Data Loggers in the Field (1985).

Automatic Collection of Data on Practical Use of Field Machines (1984).

Deere BLAST Polling System Literature (1991).

Easing into Square–Foot Farming, Farm Industry News, (Jul./Aug. 1994).

Economical, Automated Data Collection, Storage and Transfer (1986).

Extending AgObjects with OLE Automation, (revised Oct. 1, 1996).

Farmers Go for Precision Crop Management, Ag Retailer, (Nov. 1995).

FINFO: A Field and Farm Technical Information Management Program (1992).

Harvesting Information, The Rural Voice (Mar. 1994).

John Deere Information Systems advertisement (no date).

Land–Use Mapping by Digital Processing of Space Images, Gocczan et al., Foldrajzi Ertesito, vol. 32(3–4), pp. 319–323 (1983) (Abstract in English).

Mid–Tech advertisements.

Mosaic with a Meaning, Top Producers, (Dec. 1993).

Network Planning Tools and Activities in Italy, Damosso et al., 11312 MRC Mobile Radio Conference, Nov. 13–15, 1991, Nice, France, pp. 137–144.

Notes: Data Collection Software for the Poison Organiser II (1992).

Pushing for Better Crop Data, Indiana Prairie Farmer, Aug. 18, 1984.

Software Scene Portable and Desktop Computer Integrated Field Book and Data Collection System for Agronomists (1992).

The Development of a Computerized Harvest Data Collection and Organising System (1985).

Yield Monitoring Experiences (1994).

Applications Mapping Inc., "An Introduction to AppliMap".

Ag Decisions Agricultural Software, "Decision Support Software for Farm Management User Guide"(©1997).

Agris Corporation, "AgLink for Windows™ Users Manual".

Vantage Point Networks, "New Online Service Plans to Leverage Internet for Farmer Success" (Press Release, Jan. 29, 1999).

John Deere Precision Farming, "GreenStar™ Combine Yield Monitor System and Yield Mapping System, Operator's Manual".

Greenstar™, John Deere Precision Farming Systems, "John Deere Yield Mapping System, JDmap Version 2.1, User's Guide" (©1997).

* cited by examiner

Production Planning

| Scenarios | Description | Add |
|---|---|---|
| Ken Dalenberg Test | Testing Dalenberg Data | |
| Dup of Ken Dalenberg Test | Testing full duplication of CMS-based scenario. | |
| Testing Field Assignments | How about that! | |
| Save this scenario | error in addition of Remaining Op Capital | |
| Garys Scenario | Garys Test Scenario | |

FIGURE 4

Production Planning: Add Crop

| Select Crops | |
|---|---|
| Cropping programs available for use: | Cropping programs currently selected in this scenario: |
| Corn Program 1998<br>Soybean Program 1998 | Corn Program 1997<br>Soybean Program 1997<br>Soiltest Program |
| 26 | 28 |

FIGURE 5

Production Planning: Add Field

| Fields available for use: | Fields currently selected in this scenario: |
|---|---|
| Dean: 3800G5 | Bevan: North 80 |
| Dean: 3800G6 | Bevan: South 80 |
| Dean: 3800G7 | Heartland: Heartland East |
| Dean: 3800G8 | Heartland: Heartland West |
| Dirst: North 80 | Hodge: Hodge 42 |
| Dirst: South 75 | Hodge: Hodge S 84 |
| Hodge: Hodge 160 | Hume: Hume Back 50 |
| Howe: Howe | Hume: Hume Front 40 |
| James: James North 54 | Zindars: Zindars East 27 |
| James: James South 34 | Zindars: Zindars West 31 |
| ↑ 30 | ↑ 31 |

FIGURE 6

Production Planning: Edit Crop-Field Assignments

| Edit Crop-Field Assignments | Corn Program 1997 | Soybean Program 1997 | Soiltest Program |
|---|---|---|---|
| Bevan: North 80 | ✓ | ✓ | ✓ |
| Bevan: South 80 | ✓ | ✓ | ✓ |
| Heartland: Heartland East | ✓ | ✓ | ✓ |
| Heartland: Heartland West | ✓ | ✓ | ✓ |
| Hodge: Hodge 42 | ✓ | ✓ | ✓ |
| Hodge: Hodge S 84 | ✓ | ✓ | ✓ |
| Hume: Hume Back 50 | ✓ | ✓ | ✓ |
| Hume: Hume Front 40 | ✓ | ✓ | ✓ |
| Zindars: Zindars East 27 | ✓ | ✓ | ✓ |
| Zindars: Zindars West 31 | ✓ | ✓ | ✓ |

FIGURE 7

Production Planning: Acreage Constraints

| Crop or Group Name | Minimum Acreage | | Maximum Acreage | |
|---|---|---|---|---|
| Corn Program 1997 | ☐ Enforce: | none | ☐ Enforce: | none |
| Soybean Program 1997 | ☐ Enforce: | none | ☐ Enforce: | none |
| Soiltest Program | ☐ Enforce: | none | ☐ Enforce: | none |
| Corn Group | ☑ Enforce: | 50 | ☐ Enforce: | none |
| Soybean Group | ☑ Enforce: | 50 | ☐ Enforce: | none |

32 — Acreage Constraints header; 34 — Maximum Acreage; 36 — Soybean Group

FIGURE 8

Production Planning: Add Crop Group

Add Crop Group

Group Name: _____

Crops available:
- Corn Program 1997
- Soybean Program 1997
- Corn Program 1998
- Soybean Program 1998
- Soiltest Program Crops currently selected in this group:

FIGURE 9

Production Planning: Add Contract

| Add Contract | |
|---|---|
| Contract Name: | ⸺38 |
| Contract Crop: | Corn Program 1997 |
| Contract Price: | |
| Contract Quantity (Acres): | |
| Is this a firm contract? | Yes |
| Upper Bound on Contract Quantity: | 20 % |

FIGURE 10

Production Planning: Add Resource

| Select Resource | |
|---|---|
| Resources you have used in other scenarios: | Resources currently selected in this scenario: |
| Storage | Operating Capital ⸺40<br>Land ⸺42<br>Water |

| Add a Resource | |
|---|---|
| New resource name: | |
| Amount of resource available: | |
| New resource UOM: | |

FIGURE 11

Production Planning Resource: Water

| Water: Availability | |
|---|---|
| Amount of Water available | 150000 |

| Water: Usage | |
|---|---|
| Amount of Water used by Corn Program 1997 | 175 |
| Amount of Water used by Soybean Program 1997 | 200 |
| Amount of Water used by Soiltest Program | 0 |

FIGURE 12

Production Planning: Edit Field Differences

| Edit Field Differences | | |
|---|---|---|
| Field: | Hodge: Hodge 42 | |
| Crop Program: | Corn Program 1997 | |
| Resource | Default Value | Override |
| Water | 175 | 175 |
| Storage | 140 | 140 |

Save

Production Planning Scenario: Garys Scenario
Scenario Results:
Gross Income: $38,876.00
View Text
Net Profit per Crop
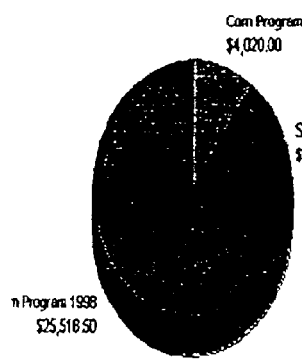
Acres per Crop
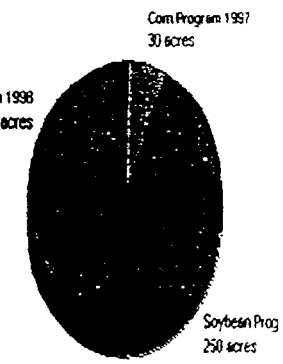
FIGURE 17
Resources
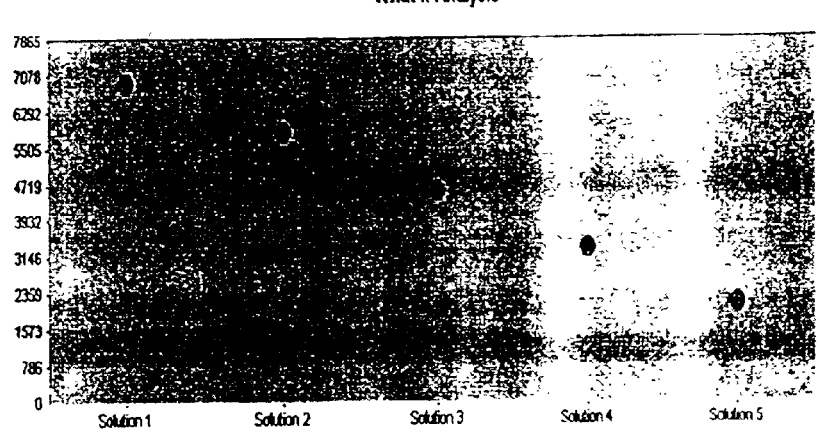
FIGURE 18

Scenario 1:
Ken Dalenberg Test

Gross Profit: $29,078.45

| Crops | | |
|---|---|---|
| Name | Acres | Net Profit |
| Corn Program 1997 | 40 | $5,360.00 |
| Soybean Program 1997 | 515 | $19,235.25 |
| Soybean Program 1998 | 0 | $0.00 |
| Soiltest Program | 0 | $0.00 |
| Kens Soybean Contract (Soybean Program 1997) | 0 | $0.00 |
| Test Contract (Soybean Program 1997) | 24 | $4,483.20 |

| Fields | | |
|---|---|---|
| Name | Size | Crop Planted |
| Bevan: North 80 | 80 | Soybean Program 1997 |
| Bevan: South 80 | 81 | Soybean Program 1997 |
| Dean: 3800GS | 81 | Soybean Program 1997 |
| Heartland: Heartland West | 44 | Soybean Program 1997 |
| Heartland: Heartland East | 30 | Soybean Program 1997 |
| Hodge: Hodge 42 | 40 | Corn Program 1997 |
| Hodge: Hodge S 84 | 82 | Soybean Program 1997 |
| Hume: Hume Back 50 | 50 | Soybean Program 1997 |
| Hume: Hume Front 40 | 38 | Soybean Program 1997 |
| Zindars: Zindars | 29 | Soybean Program 1997 |

Scenario 2:
Dup of Ken Dalenberg Test

Gross Profit: $61,899.50

| Crops | | |
|---|---|---|
| Name | Acres | Net Profit |
| Corn Program 1997 | 448 | $60,032.00 |
| Soybean Program 1997 | 50 | $1,867.50 |
| Soiltest Program | 0 | $0.00 |
| Kens Soybean Contract (Soybean Program 1997) | 0 | $0.00 |

| Fields | | |
|---|---|---|
| Name | Size | Crop Planted |
| Bevan: North 80 | 80 | Corn Program 1997 |
| Bevan: South 80 | 81 | Corn Program 1997 |
| Heartland: Heartland West | 44 | Corn Program 1997 |
| Heartland: Heartland East | 30 | Corn Program 1997 |
| Hodge: Hodge 42 | 40 | Corn Program 1997 |
| Hodge: Hodge S 84 | 82 | Corn Program 1997 |
| Hume: Hume Back 50 | 50 | Soybean Program 1997 |
| Hume: Hume Front 40 | 38 | Corn Program 1997 |
| Zindars: Zindars West 31 | 29 | Corn Program 1997 |
| Zindars: Zindars East 27 | 24 | Corn Program 1997 |

| Resources | | |
|---|---|---|
| Name | Used | Unused |

FIGURE 19

SYSTEM AND METHOD FOR DEVELOPING A FARM MANAGEMENT PLAN FOR PRODUCTION AGRICULTURE

This document claims priority based on U.S. provisional application Ser. No. 60/228,857, filed Aug. 22, 2000, and entitled METHOD AND SYSTEM FOR DEVELOPING SINGLE YEAR OR MULTI-YEAR CROP SELECTION, ACREAGE ALLOCATION AND RESOURCE MANAGEMENT STRATEGIES FOR PRODUCTION AGRICULTURE, under 35 U.S.C. 119(e).

FIELD OF THE INVENTION

The present invention relates to production agriculture, and more specifically to a system and method for deploying an electronic-based system to support farm management planning and decision making. Moreover, the present invention can be used for identifying, evaluating and optimizing options for crop selection, crop rotation, resource allocation, risk management and farm production-related commerce transactions, based on the user's input and the input from third party industry professionals.

BACKGROUND OF THE INVENTION

In an effort to maximize profit and profit potential, farmers and farm managers use a variety of methods in deciding what crops to grow for a given amount of acreage. Some farmers have more options at their disposal, and hence more complex decisions must be made. Accordingly, some farmers' methods are more structured and rigorous than others. Additionally biological and climatological factors constrain farmers' crop selection options. Moreover, economic factors, such as, for example, market prices, participation in government farm subsidy programs or conditions for credit, often influence or dictate crop selection and acreage allocation (i.e. the amount of land devoted to a specific crop). For purposes of the present invention, acreage allocation refers to the amount of land devoted to a specific crop. Finally, subjective elements, such as, for example, tolerance for risk, willingness to experiment, use of technology, knowledge and experience affect crop selection decisions.

Crop selection decisions are normally comprised of three primary elements—objectives, information and constraints. Farm planning decisions are governed by trade-offs between multiple objectives such as, for example, profit maximization (i.e., a collection of decisions and activities that result in the highest returns on assets), risk minimization (i.e., a collection of decisions and activities that result in the least risk given present uncertainties and potential outcomes), desire for independence and inter-generational stewardship (i.e., a collection of decisions and activities which result in the greatest environmental enhancement and the least ecological damage from agricultural activities). The relativistic level of importance of each of these objectives varies for each farmer. Information and advice on crops and markets are also available from extension agents, agricultural lenders, commodity groups, friends, neighbors, private information services and consultants. Finally, the allocation of crops to acreage may be constrained by such factors as, for example, feasible crop types, rotation patterns, resource availability, economic and market conditions and an individual's tolerance of market and natural risk.

With regard to constraints, farmers are limited to specific crop alternatives by such factors as, for example, soil characteristics and climate that is primarily dictated by geography. This translates into an agronomic (i.e., biological) viability and a regional comparative advantage. For purposes of the present invention, viable crops are crops that, based on the given constraints, can be grown on a given farm with at least a minimum economic return. The farmer may further be limited by availability and access to various resources such as, for example, capital, land, water, labor, machinery, etc.

To select which crops to plant, as well as the most optimum amount of the crop, the farmer estimates production costs and projects crop market prices and yield to calculate an expected rate of return for a given crop. The farmer assesses the variance of projected prices and yields. Contracting for a crop can alleviate market uncertainty; however, crop yield uncertainty is a function of uncontrollable factors inherent in agriculture, such as, for example, weather and blight.

Finally, the farmer must consider risks. Risk management strategies include, for example, crop rotation, crop diversification, forward contracting (i.e., the practice of selling a crop prior to harvest and/or prior to planting; such a practice reduces market risk by establishing a fixed price) and financial instruments such as, for example, futures options (i.e., contracts giving one party the right to buy/sell a commodity at a particular price during a specific time frame; options are used to hedge risk by balancing an investment position). There are other dimensions of risk including, for example, willingness to implement unproven practices, early adoption of new technologies, new crop varieties and new marketing methods.

Farmers who qualify for participation in government farm programs (i.e., by growing crops covered under such programs and complying with program restrictions) often maximize their return on investment and minimize their risk by maximizing the revenue available under these programs. Should these programs be reduced or eliminated, many farmers' decision making processes will probably change due to a changed risk profile, as the farmer will most likely assume more market and production risk.

Farmers developing cropping strategies, in addition to consideration of the above factors, must understand controllable factors such as, for example, crop mixes and rotations, input quantities (chemical and water applications) and management practices and field operations (e.g., tillage, plant spacing and harvesting). Farmers developing cropping strategies must also consider uncontrollable factors such as, for example, weather and markets. Assessment of controllable and uncontrollable factors translates into additional constraints and objectives. That must be considered by farmers developing cropping strategies.

Production and market information are evaluated in the context of the farmer's objectives to frame crop selection decisions. The crucial decisions primarily consist of how many acres of each crop to plant in the context of the stated objectives of profit maximization, risk minimization and stewardship. These decisions can become quite complex, depending on such factors as, for example, the number of crops under consideration, the length of the growing season, rotation patterns, available resources, variability of price and yield, etc. Careful planning and decision-making are critical to profitable farming. The planning phase of the annual cropping cycle is the point at which the farmer has the most leverage to influence profit potential.

There are few computer-based tools to help farmers during these critical planning and decision making periods. Although inexpensive and powerful personal computers are readily available to farmers and farm managers, decision support software for crop selections has not been developed. While a number of firms market agricultural-related personal computer software, such products primarily perform record-keeping and accounting functions. Optimization algorithms are not utilized near their potential for decision analysis for farm planning and crop selections.

Mathematical modeling software (i.e., the process of constructing and solving algebraic equations to gain insight into an issue and the potential outcomes of proposed actions), and algorithms such as linear programming (i.e., a method for representing a problem as a system of interdependent linear equations), integer programming (a type of linear programming where solution variables must be whole numbers), mixed integer programming (a mathematical representation where some solution variables are integers and some are not); and dynamic programming, exist and are used in other industries. These modeling tools are used in some areas of agriculture for functions such as livestock feed mixing (see Markley, U.S. Pat. No. 3,626,377), but for the most part these modeling tools have not found widespread use in the field of production agriculture.

Purdue University and other land-grant universities' extension programs have in the past attempted to introduce area farms to linear programming models. In the U.S. Department of Agriculture's 1989 *Yearbook of Agriculture* (pp. 147), Howard Doster, Extension Economist at Purdue discusses the application of linear programming models to farm management decisions such as machinery allocation. However, such models were run on a large mainframe computer rather than a personal computer. Several land-grant universities have developed software for farm planning based upon crop budgeting rather than optimization techniques such as mathematical programming. Some of these programs help farmers maximize revenue by structuring their crop selection decisions based on revenue enhancing opportunities provided by Government farm programs. However, the utility of much of this software is often geographically limited. The large number of variables inherent in agricultural enterprises, and the regional variability, imposes limitations upon the utility of existing software outside of the region.

Further, none of the existing programs utilize data from third party industry professionals or sources, such as input supply retailers, manufacturers of seed and crop protection products, crop consultants, crop insurance agents, agricultural lenders, marketing advisors, agricultural certified public accountants and agricultural equipment dealers. The information and data provided by these sources are necessary to obtain the optimal farm management plan for a particular farmer.

Therefore, a need exists for a system that overcomes the above-stated disadvantages.

SUMMARY OF THE INVENTION

The present invention functions as a personal farm management consultant—helping farmers and professional advisors working with farmers, to develop optimum custom, seasonal or multi-seasonal cropping strategies. The present invention enables farmers and professional advisors to work simultaneously from different locations to develop a single production planning analysis. The present invention provides farmers with the capability to improve farm profitability by assisting in, inter alia, crop selections and resource management (i.e., the allocation of farm resources such as capital, land, labor, machinery, etc., to a combination of crop enterprises to achieve farm objectives). Moreover, the present invention links the farmers' intimate knowledge of their farms with principles of agricultural economics, market analysis and operations management. Employing microeconomic and operations research principles to production agriculture, combined with a farm-specific and regional knowledge base, makes the present invention a universal planning tool which can be used anywhere regardless of a farmers' geographical location.

Once implemented, users of the present invention can quickly compare the profit potentials, risk, cash flow and resource consumption of competing cropping strategies. For each selected cropping strategy, the effects of resource constraints and variable projections in crop prices and yields are quantified. Sensitivity analysis is then performed via intrinsic rules—determined internally and/or by the user—to perform integrated "What if?" queries. Selected parameters may be systematically altered to provide insight as to the most optimum cropping strategy. These parameters include, without limitation, the impact of variances in prices, yields and production cost projections, and the sensitivity of proposed cropping strategies in relation to these uncertainties; the effects of varying or substituting input resources such as land, labor, capital, etc., on different cropping strategies; the marginal values of acquiring additional critical resources and changes in these marginal values; the estimated quantities of marketable, non-critical resources and reasonable asking prices; the effects of variations in market prices, as well as comparing changes in production costs for a particular cropping strategy; the break-even points of different cropping strategies; the profit potential of increasing, decreasing or substituting input resources such as capital, acreage, labor, fertilizers, pesticides, etc.; the feasibility of participating in specific Government farm programs by examining potential returns under various program scenarios and analyzing how changes in Government farm programs should influence farm production given price supports, conservation reserve acreage requirements and maximum and minimum acreage limitations; and the evaluation of risk management strategies and the benefits or opportunity costs available through futures options, forward contracting, farm programs and diversification.

The present invention is thus a valuable tool for farmers and industry professionals who work with those farmers. Moreover, deploying the present invention through an electronic medium such as, for example, the Internet, enables these professionals to work with the farmer-clients remotely and enables unfettered access to the production planning system and requisite data. Some of these third party industry professionals, and the use of the present invention to their core businesses, are the input supply retailers, assisting farmers with production planning decisions. This can lead directly to product sales, since the type and quantity of input products (e.g., seed, fertilizer, crop protection, dates and locations for custom applications) are the result of the production planning analysis. Also, seed and crop protection manufacturers' field representatives using the present invention can assist farmers with production planning decisions. This can lead directly to sales of the input products they represent. Independent crop consultants using the present invention can assist farmers with production decisions, complementing their traditional agronomic services. Crop insurance agents using the present invention can assist farmers with production planning decisions, including evaluating the type and amount of crop insurance in the context of the farmer's overall risk profile. Agricultural lenders using the present invention can assist farmers with production planning decisions, including determining the appropriate amount of an operating loan and proper interest rate based on production and market risk. Marketing advisors using the present invention can assist farmers with production planning decisions to subsequently develop a marketing plan for the farmer based on the selected crop-acreage combination, the amount of contracted acreage and the level of crop insurance. Agricultural certified public accountants using the present invention can assist farmers with production planning decisions as part of their financial and investment advisory services. Also, agricultural equipment dealers using the present invention can assist farmers with production planning decisions and help the farmer determine whether equipment capacity is adequate to execute the production plan.

The present invention integrates several independent planning and analysis functions, such as, for example, systems modeling, mathematical programming, optimization techniques and market analysis. These functions are integrally linked within the present invention and combine input from a user-friendly interface with easy-to-understand graphical output. When linked with a farmer's experience and knowledge of farming, the present invention can become a powerful decision-making tool.

In addition, the present invention has the capability to import expected crop prices from external or third party sources via the Internet or a virtual private network. Other model parameters can also be automatically imported such as, defined bundles of crop inputs and product prices, as well as production contracts and other production risk management products.

The output generated through an interactive session between the user and the present invention is a farm management plan. This farm management plan reflects the user's preferences towards particular crops, available resources, management capabilities and level of risk aversion. In addition, the farm management plan compiles a list of production inputs (including, without limitation, seed, chemical, fertilizer, etc.) and other associated plan elements (including, without limitation, level and type of crop insurance policies, forward production contracts, operating loan requirements, etc.). These production inputs and other associated plan elements may be transmitted electronically (i.e., via the Internet or a virtual private network) to vendor ordering systems for price quotes and/or purchase orders.

Moreover, these farm management plans are formulated through an iterative process. The mathematical farm model may systematically be re-analyzed by altering critical resource parameters (i.e., controllable variables) according to output generated by the previous analyses and responses from the user to system queries. The present invention also delineates the effects of increasing or decreasing operating capital, acreage, water, labor, machinery or any other controllable resource, and specifies the amount projected profits will increase or decrease by varying these resource quantities. The present invention points out where increasing critical resources by the equivalent of one dollar has the potential to return several dollars of additional profit, i.e., increasing returns to scale. It can identify the most profitable combinations of crops and acreage that use the least amount of pesticides, water, labor, capital, etc. Conversely, excess resources such as land, machinery, water, etc., can be identified and evaluated for marketability to generate additional revenue. This management information can maximize efficiency and enhance the profit potential of the overall farming enterprise.

Once a final combination of resources has been selected, the present invention analyzes the sensitivity of the optimal cropping strategy to variances in prices, yields and production costs (i.e., uncontrollable variables or uncertainties). This minimizes risks by establishing upper and lower bounds for various combinations of prices, yields and production costs. For sensitive crop selections, the probabilities of receiving the target prices and reaching the target yields (functions of random variables) are evaluated. If these fall below threshold bounds, parameters are altered and the model is re-analyzed. Results under these various scenarios are then displayed. Where appropriate, further sensitivity analysis is performed. Often combinations of price, yield and resource variations are analyzed several times—a process ultimately leading to the generation of more refined and less volatile cropping strategies that satisfy the user's objectives.

If necessary, the present invention requests additional information and performs further analysis using intrinsic rules. The present invention can suggest that the user closely examine a questionable or sensitive parameter. Continuous input by the user and feedback via the present invention ensures the evolution of a final cropping strategy that satisfies the user's needs and meets the user's goals. Parametric programming algorithms (i.e., the systematic process of changing model parameters) are used to selectively alter model parameters. The present invention then stores the model parameters for future reference and quickly answers "What if?" questions pertaining to variations in yields, prices or resources (i.e., controllable and uncontrollable variables).

After reviewing sensitivity parameters, the present invention generates alternate cropping strategies. The user can quickly and easily evaluate resource usage, profits, opportunity costs and risks associated with hundreds of possible variations in crop yields, market prices and resources to optimize crop selection decisions. Information is compiled in easy-to-understand graphical and tabular formats highlighting important parameters in order to help farmers or managers compare and select optimum cropping strategies.

The present invention retains information from iterative steps. If requested, the consultation can be audited (via a traceback mechanism) from the final cropping strategies to the start of the planning session. The user may request a hardcopy of the consultation. This provides the user a better understanding of how responses to specific questions influenced changes in cropping strategies and determined final crop selections.

Through interaction with the present invention, a farm-specific knowledge base is built, retained and referenced for future consultations. Information may be supplemented, as necessary, with updated and regionally-specific crop production and marketing data which is also stored in the portable knowledge base that can be modified at the discretion of the user.

Many aspects of farming are regionally specific; however, production and planning principles are fundamental. Unlike farm management computer software developed by regional land-grant universities, the present invention comprises a universal planning tool that can be used irrespective of locale, crops, or resources. The present invention uses farm-specific and regional data (inputted by the user) and stores this information in a database. The present invention can also use a pre-defined regionally-specific knowledge base to supplement user-supplied information with regional crop, production and marketing data.

One of the major economic advantages of the present invention is the ability to help farmers and farm managers quickly evaluate an infinite number of feasible crop and acreage combinations and to determine optimal cropping strategies. This translates into better management decisions. The present invention quantifies and graphically identifies the most profitable combinations of crops, acreage and resources within the context of the farmers' goals—based upon indicated farm management preferences (i.e., the types of crops under consideration, and the amounts and combinations of farm resources used and other predilections), experience, cash flow and projected market conditions. This information helps farmers make more informed and intelligent crop selection decisions.

Further objects and advantages of the present invention within the field of production agriculture will become apparent from a consideration of the drawings and ensuing description.

BRIEF DESCRIPTION OF THE FIGURES

FIG. 4 illustrates a screenshot for modifying an existing scenario of the system of FIG. 1, made in accordance with the present invention;

FIG. 5 illustrates a screenshot for selecting crop programs of the system of FIG. 1, made in accordance with the present invention;

FIG. 6 illustrates a screenshot for selecting fields of the system of FIG. 1, made in accordance with the present invention;

FIG. 7 illustrates a screenshot for setting field/crop rotations of the system of FIG. 1, made in accordance with the present invention;

FIG. 8 illustrates a screenshot for setting crop limits of the system of FIG. 1, made in accordance with the present invention;

FIG. 9 illustrates a screenshot for setting crop group limits of the system of FIG. 1, made in accordance with the present invention;

FIG. 10 illustrates a screenshot for setting forward production contracts of the system of FIG. 1, made in accordance with the present invention;

FIG. 11 illustrates a screenshot for selecting resources of the system of FIG. 1, made in accordance with the present invention;

FIG. 12 illustrates a screenshot for setting resource quantities of the system of FIG. 1, made in accordance with the present invention;

FIG. 13 illustrates a screenshot for setting field differences of the system of FIG. 1, made in accordance with the present invention;

Figures 15, 16:
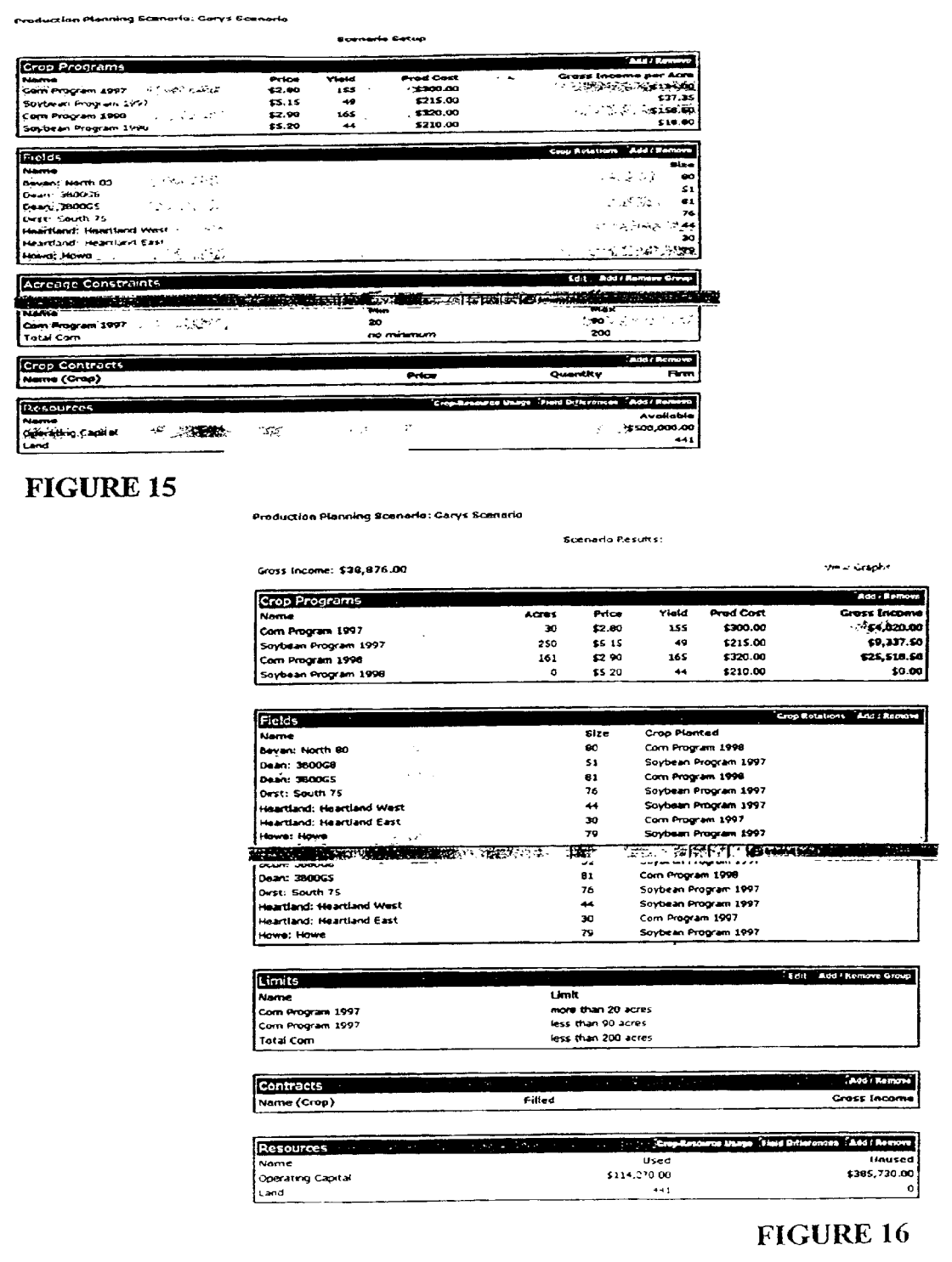

FIG. 15 illustrates a screenshot for viewing the scenario setup of the system of FIG. 1, made in accordance with the present invention;

FIG. 16 illustrates a screenshot for viewing the optimized solution in tabular form of the system of FIG. 1, made in accordance with the present invention;

FIG. 17 illustrates a screenshot for viewing the optimized solution in graphical form of the system of FIG. 1, made in accordance with the present invention;

FIG. 18 illustrates a screenshot for performing what-if analysis by automatically varying constraint values of the system of FIG. 1, made in accordance with the present invention;

FIG. 19 illustrates a screenshot for comparing scenarios of the system of FIG. 1, made in accordance with the present invention.

DETAILED DESCRIPTION OF THE PREFERRED EMBODIMENTS

Described below is a preferred method for configuring and deploying a custom farm management plan, and in particular, a system for developing single-year or multi-year crop selection, acreage allocation and resource management strategies for production agriculture so as to evaluate trade-offs in farming objectives. These trade-offs include, for example, one or more of the following: profit maximization, risk minimization, resource minimization and environmental stewardship. Preferably, the method may comprise one or more of the following aspects:

(a) electronically acquiring from a user, an electronic batch file containing information on farm management preferences, physical farm parameters, viable crops and controllable resources which may then be translated into electronic data and stored in a database;

(b) electronically acquiring from a third party industry professional or source, data or information pertaining to one or more of the following: seed prices, fertilizer prices, production contracts, agriculture insurance rates, agriculture marketing information, agriculture consultants' information, agriculture accounting information and agriculture lenders' rates;

(c) using the electronic data to formulate a mathematical model which represents a farming enterprise;

(d) analyzing the mathematical model using one or more of the following techniques: linear, integer, mixed integer programming and parametric programming algorithms. The analyzation means may then be used to generate cropping strategies, acreage allocations and resource management strategies to identify potential trade-offs in the objectives;

(e) generating tabular and graphical output depicting the trade-offs for each strategy;

(f) allowing the user to visualize and interactively alter model parameters to evaluate alternative farm resource allocation strategies which combines the use of a linear programming model and integrated parametric programming with real-time multidimensional trade space analysis and graphics generation; and (g) using the system in a structured planning and analysis framework.

The system of the present invention can be configured to run on a personal computer (as in the form of software), a server or other electronic means to perform these functions.

Figure 1:
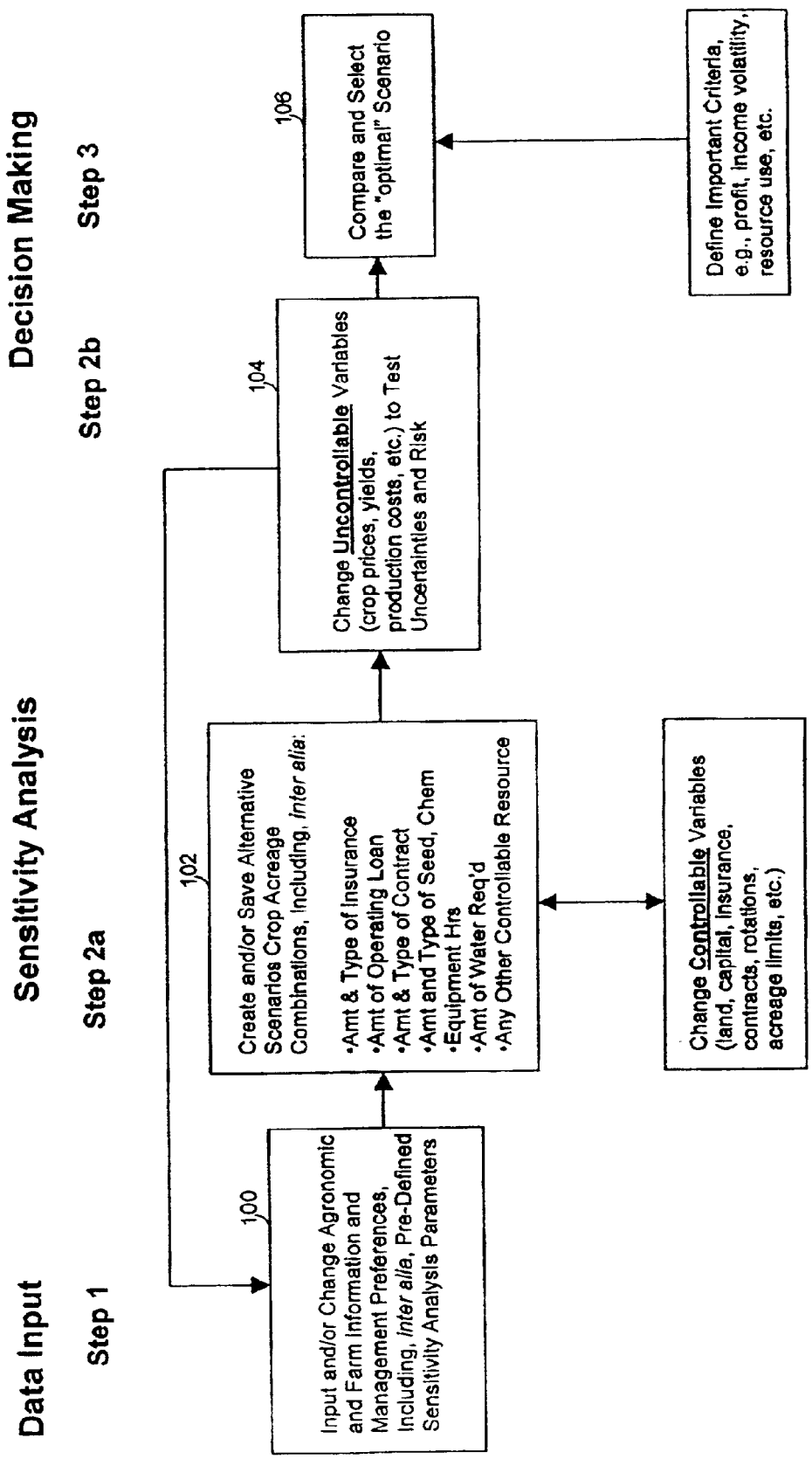
FIG. 1 illustrates an overview of an embodiment of a system for developing a farm management plan for production agriculture, made in accordance with the present invention.

FIG. 1 illustrates a top-level overview of the production planning process described above. The process is preferably comprised of four primary steps. As shown in Step 1 100, a user inputs or changes agronomic, operational and physical farm information to represent different farming scenarios. In Step 2a 102, the user generates and stores alternative production planning scenarios by adjusting variables that represent controllable management decisions such as, for example, different crop programs, crop rotation patterns, different amounts and types of production contracts and crop insurance. In Step 2b 104, the user changes uncontrollable variables such as, for example, crop prices, yields and production costs that represent production planning assumptions associated with different types of risk. Finally, in Step 3 106, the user compares these scenarios based on subjective criteria such as, for example, gross income, downside risk and resource use. The user can then select a scenario strategy that meets his desired goals or, alternatively, performs additional analysis to generate more scenarios—i.e., iteratively repeating Steps 2 and 3.

Figure 2:
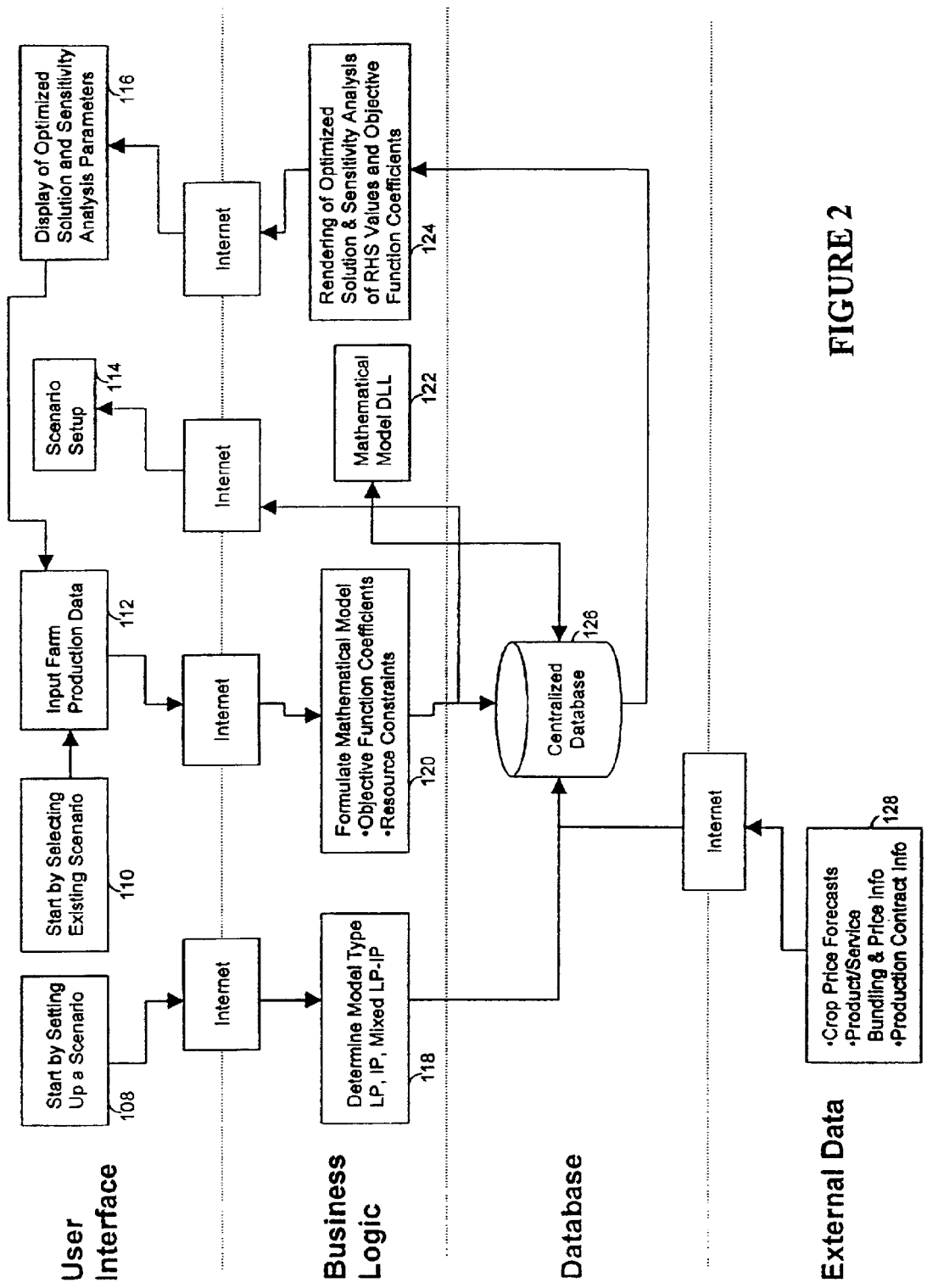
FIG. 2 illustrates an overview of a three-tier architecture of the system of FIG. 1, made in accordance with the present invention and depicting the user interface, the business logic, the centralized database and data feeds from external sources.

FIG. 2 shows a process flow chart and accompanying system configuration implementing the production planning process of FIG. 1. An electronic user interface, such as that shown in FIGS. 3–13 and 15–19, is used to collect, store and process farm model parameters. As discussed below, FIG. 3 relates to setting up a scenario 108; FIG. 4 relates to selecting an existing scenario 110; FIGS. 5–13 relate to inputting farm production data 112; FIG. 15 relates to the scenario setup 114; and FIGS. 16–19 relate to the display 116. FIG. 2 also shows four primary groupings of business logic. This business logic consists of, without limitation: 1) the processes and means for determining the type of mathematical model to employ 118; 2) the processes and means for formulating the mathematical model by extracting the appropriate numerical data from the database and combining the data to develop the appropriate coefficients and constraints and the objective function 120; 3) the processes and means for the mathematical algorithm to solve the production planning mode 122; and 4) the processes and means for rendering the optimized solution and for performing sensitivity analysis of RHS values and objective function coefficients 124.

FIG. 2 also shows the interaction between the centralized database 126 and the business logics 118, 120, 122, 124 whereby the centralized database 126 responds to calls for providing data to the business layer for mathematical manipulations and stores returned values generated by the business layer. FIG. 2 also shows the import and storage of external data 128 including, without limitation, crop price forecasts, input product bundling information and production contract information; this data is stored in the centralized database 126 and made available for developing scenarios.

To implement the method of FIGS. 1 and 2, the present invention defines a system comprised of software, hardware and business processes for developing production goals and resource management strategies by evaluating trade-offs in production management objectives where the objectives are at least one or more of the following: profit maximization, risk minimization, resource minimization and customer satisfaction, wherein the method preferably comprises one or more of the following steps:

(a) electronically acquiring, from a user an electronic batch file containing information on management preferences, physical production parameters, production activities and products and controllable resources which may then be translated into electronic data and stored in a database;

(b) electronically acquiring from a third party industry professional or source, data or information pertaining to one or more of the following: seed prices, fertilizer prices, production contracts, agriculture insurance rates, agriculture marketing information, agriculture consultants' information, agriculture accounting information and agriculture lenders' rates;

(c) using the electronic data to formulate a mathematical model which represents a production enterprise;

(d) analyzing the mathematical model using one or more of the following techniques: linear, integer, mixed integer programming and parametric programming algorithms. The analyzation means may then be used to generate production strategies, resource allocations and resource management strategies to identify potential trade-offs in the objectives;

(e) generating tabular and graphical output depicting the trade-offs for each strategy;

(f) allowing the user to visualize and interactively alter model parameters to evaluate alternative production resource allocation strategies which combines use of a linear programming model and integrated parametric programming with real-time multidimensional trade space analysis and graphics generation;

(g) using the system in a structured planning and analysis framework;

(h) using the optimized scenario to generate an order or bill of materials for production inputs and forward production contracts; and (i) interactive price discovery for bundled inputs and services, as well as production contracts.

The preferred method implementing the present invention involves four sequential sub-processes: 1) data acquisition and storage; 2) model formulation, analysis and output; 3) sensitivity analysis; and 4) the sub-process of exporting a bill of materials or order for inputs, other products or services and production contracts. Additionally, alternative cropping strategies may be formulated and evaluated through an iterative process of altering model parameters, reformulating the model and re-analysis.

In the first sub-process (i.e., the data acquisition and storage phase, the system of the present invention preferably requests information, from a user or other operator, on management objectives and farm-specific baseline data. If a program has not been previously used to model the farming operation, the system will employ an "input wizard" (or other similar tutorial-type operation) to sequentially lead the user through a pre-defined series of screens.

If an existing scenario has been used, the "input wizard" will not normally be employed; rather, the input screens are called at the discretion of the user. The process omits queries when farm-specific information has been previously entered. Additionally, if the user intends to modify an existing scenario, a user interface calls a business logic component that calls a database and loads parameters associated with the existing scenario.

Production planning information (i.e., input) may be entered from a template, i.e., a form completed by the user prior to the planning session. The template facilitates data collection and data entry. Input data may also be transmitted into the system via a portable data file or real-time via electronic data streaming via a computer server and various telecommunications modes. For purposes of the present invention, real-time refers to the ability to interact with the program instantaneously as opposed to giving a command and waiting for the command to be executed several milliseconds later.

Figure 3:
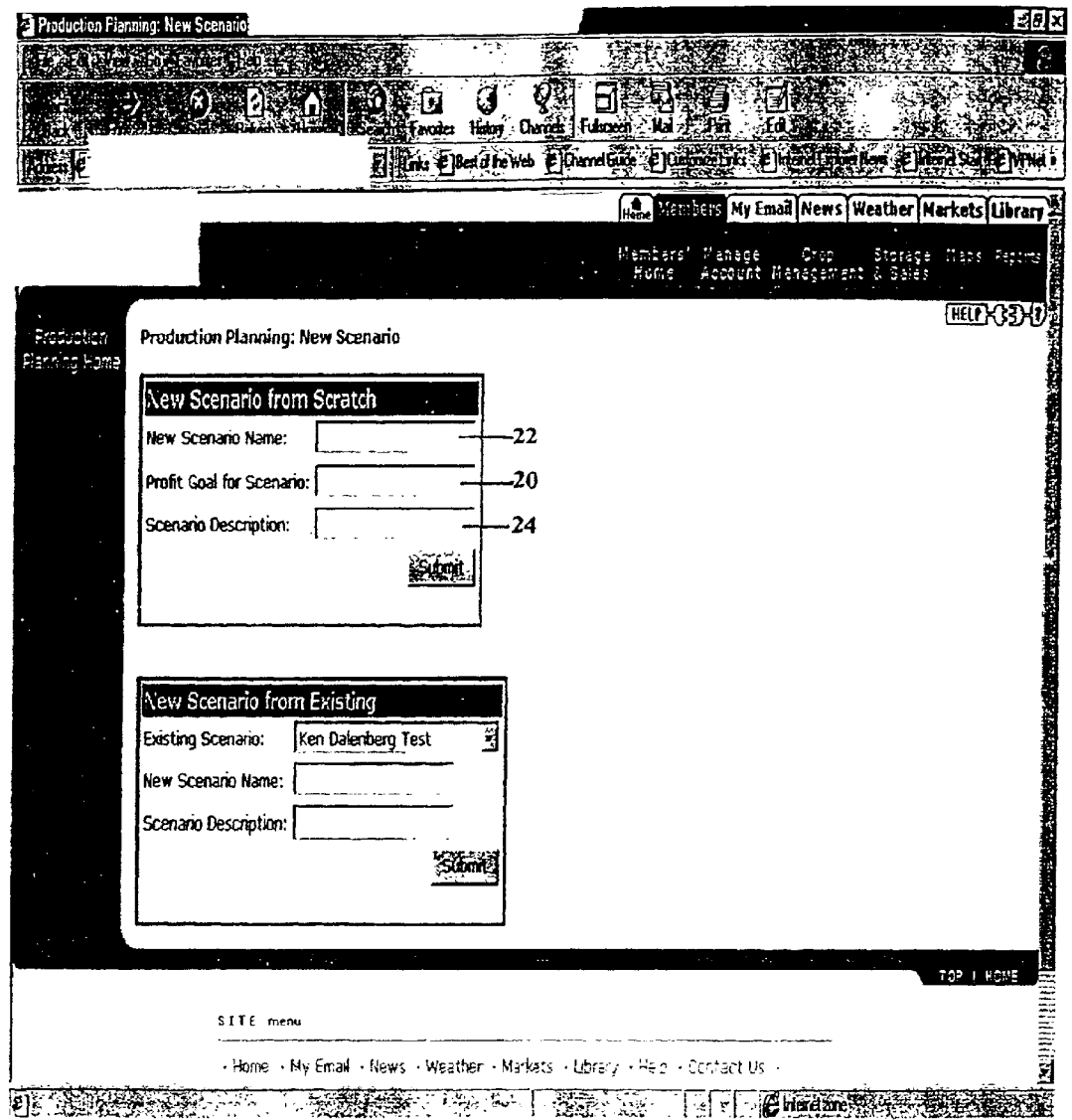
FIG. 3 illustrates a screenshot for creating a new scenario of the system of FIG. 1, made in accordance with the present invention.

The description below of the preferred sequential steps in the operation of the present invention assumes that the program is being run for the first time; therefore, an existing scenario does not exist and a new scenario must be created. The creation of a new scenario is shown in FIG. 3. As illustrated by FIG. 3, the user is led through a series of screens that collect the appropriate production planning information. Alternatively, FIG. 4 illustrates a method of creating a new scenario by modifying an existing scenario (this method eliminates the need to re-enter existing scenario parameters since only different parameters need to be changed).

In creating a new scenario, first the user defines preferences as to farms, fields and crop programs. Defining farms and fields involves the delineation of discrete production land units on which production planning scenarios are built. Defining crop programs includes forecasting unit crop prices and crop yields to project revenue per acre as well as developing variable production costs by identifying input quantities and unit costs. The user then determines what controllable resources (such as, for example, labor, water, equipment hours, crop storage, etc.) to also include in the analysis.

Next, the user determines their profit goal 20, the name of the scenario 22 and a scenario description 24. The scenario description 24 provides the means for the user to identify differences between scenarios for later evaluation.

After entering information associated with the scenario set-up procedure illustrated in FIG. 3, user interfaces shown in FIGS. 5–13 gather data necessary to construct the mathematical model of the farming enterprise.

As illustrated in FIG. 5, the user is given the opportunity to select any desired previously-created crop programs 26 for inclusion in the newly-created scenario 28. Such crop programs contain estimated yields, price forecasts and variable production costs. In addition, planting and harvest dates may be specified for use in determining cash flow requirements and double-cropping opportunities.

Next, the user selects any desired previously-created fields 30 for inclusion in the scenario 31. This is illustrated in FIG. 6. Preferably, field size is defined when the fields were originally created. Fields not selected will not be assigned crops, i.e., these fields will be fallow for the purposes of this planning scenario.

The user then sets crop-field rotation options, as illustrated in FIG. 7. Each identified crop-field option will create a unique decision variable for the mathematical model. Crop-field combinations not selected will not be considered. Using this method, crop rotations can be designated and perennial crops reflected in the analysis.

Next, crop acreage limits are defined. This is illustrated in FIG. 8. Crop acreage limits provide the user the opportunity to define upper 32 and lower 34 bounds on the amount of acreage (and specific fields) dedicated to a specific crop in a scenario. These acreage constraints 32, 34 are used to set diversification limits and for other risk management and agronomic purposes as well as to assure compliance with acreage requirements for Government farm programs. For example, setting a minimum acreage for spring wheat of 100 acres will generate a mathematical model constraint such that the scenario must contain at least 100 acres of wheat in a combination of one or more fields. This constraint must be satisfied even if profitability is adversely affected. The same is true for maximum acreage constraints. Both minimum and maximum acreage constraints 32, 34 may be applied to one or more crop programs. Setting a minimum and maximum acreage constraint 32, 34 equal for the same crop will define an exact acreage limit for that crop program.

In addition to setting crop acreage limits for specific crops, the user may set minimum and maximum acreage limits for groups of crops 36. Groups of crop limits 36 (which can be selected as shown in FIG. 9) ensure some minimum or maximum combination of crops within the group are selected. The exact combination selected will be comprised of the most profitable combination in the context of other constraints and rotation options.

As illustrated in FIG. 10, the user then defines production contracts. Production contracts are derived from pre-defined crop programs 38. If the production contract represents a different crop (in terms of production costs, production practices, yield and yield variances) the user must define a new crop program to represent the production contract crop. A production contract identified as committed (or firm) indicates that the user has already decided to obligate some amount of acreage to the contract production; hence, a minimum acreage constraint is formulated and incorporated into the model. The contract price is used for the revenue component of the objective function coefficient.

FIG. 11 illustrates the selection of crop production resources. By default, operating capital 40 and land 42 are the only required constraints; these constraints are developed implicitly. Additional resource constraints are created at the discretion of the user. For example, if a user would like to create a constraint for a special type of (e.g., preserved) corn, the user enters the name of the constraint and the amount of the resource; this amount of the available resource is used to represent the constraints' RHS. For each resource constraint, the user enters the amount of that resource required for each acre of production of that crop program. This is illustrated in FIG. 12.

The final data input user interface is shown in FIG. 13. This feature is used to delineate differences in resource use for specific fields. For example, if a particular field has sandy soil and uses more irrigation water than other fields, this field-specific value is used as the resource constraint coefficient representing the decision variable associated with that field. In this way, if water is a critical (limiting) resource, the system will attempt to identify crop programs for that field that use the least amount of water (in terms of maximizing the per acre profit per unit of water).

Figure 14:
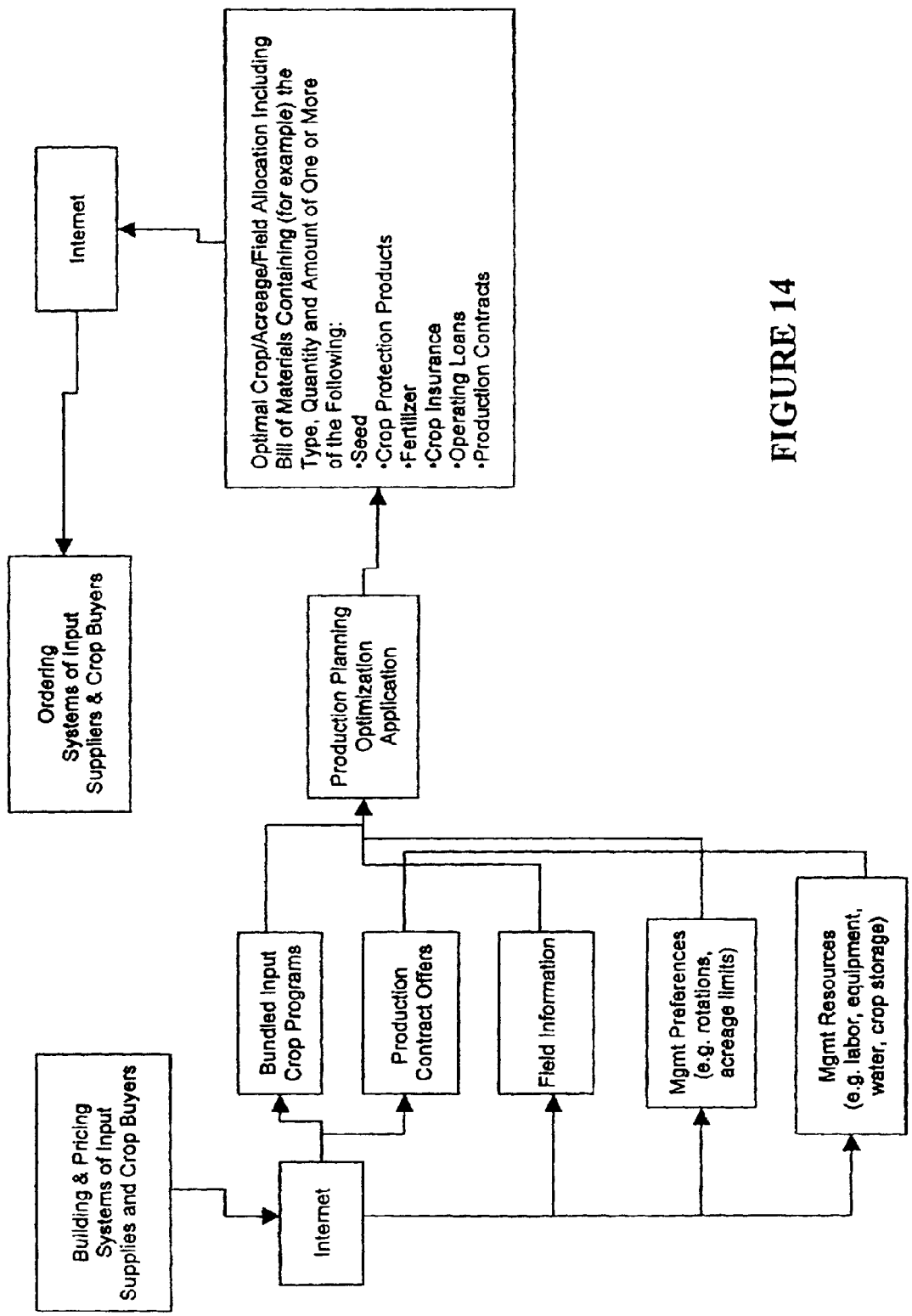
FIG. 14 illustrates the process flow for a system and method to import relevant information, using this information in the production planning system and generating an electronic bill of materials for product and service orders and subsequent transactions as an embodiment of a system for developing a farm management plan for production agriculture, made in accordance with the present invention.

As shown in FIG. 14, the present invention provides the user with the capability to link the production planning analysis with real-time input bundling (e.g., seed, crop protection chemicals, insurance, loans, etc.) and contract pricing such that during the analysis, those entities with whom the farmer is considering executing a business transaction can modify their product pricing such that their products are positioned more or less favorably during the analysis process. These modified prices are reflected in the objective function of the mathematical optimization model (more specifically, as changes in per acre profit coefficients) as well as in specific constraints such as the capital constraint.

Once the present invention has generated an optimal solution (based on user-inputted parameters), sensitivity parameters associated with objective function cost coefficients are generated. These coefficients ([estimated crop price*estimated crop yield]−variable production costs), when decomposed into these basic elements, provide price points for product input bundles or production contracts whereby the optimal solution will change such that a product bundle or production contract that was not selected will be selected in subsequent analysis.

The implications of this capability are such that the present invention can (during runtime or subsequent to runtime) send out electronically, e.g., via a global electronic communications network, such as the Internet or a private network, information about the analysis results and specifically what products were selected and at what price, and what products were not selected and at what price. An entity that desires to generate a transaction with the farmer can send back to the subject invention via the Internet or a private network a revised price for a product bundle or contract such that when the production planning mathematical optimization analysis is re-run, a new solution will be generated that considers the revised product pricing. This process can be repeated and can support multiple vendors simultaneously interacting with the farmer via the subject invention. The global electronic communications network can include the Internet, an Intranet, an extranet, a Local Area Network, a telephone network, a cellular network, a satellite network, a personal communication system, a television network, a wireless data network, a wireless Local Area Network, a wireless local loop/distribution system, a Voice Over Internet Protocol network, and a wide area network. Following completion of the production planning analysis process, a product order can be generated. As illustrated in FIG. 15, after entering all the necessary information, the present invention displays this information for user verification. The user can alter any information before the analysis phase. Information collected from the user interfaces (as illustrated and described with reference to FIGS. 5–13) are stored in the database for later retrieval and manipulation.

As illustrated by Step 2 of FIG. 1, business logic components use the information collected above to formulate a mathematical model of the farming operation. The algorithm of the present invention preferably pinpoints optimal cropping scenarios and perform sensitivity analysis.

FIG. 2 shows four primary components of business logic. These are 1) model selection 118; 2) formulation of the mathematical model 120; 3) the mathematical model 122; and 4) analysis results and sensitivity analysis 124.

The system of the present invention selects the most appropriate type of mathematical algorithm to represent the farming operation (i.e., the model selection business logic 118). If the user is planning by fields, a mixed integer programming model is used. If the user is performing production planning without respect to fields, a continuous linear programming model is used. The user may move back and forth between these two model types in order to better understand the impact on a scenario due to the additional level of constraints associated with a mixed integer programming method that reflects planning in terms of fields.

The next business logic component formulates the mathematical model 120. This particular model is comprised of decision variables, objective function and coefficients and constraint RHS values and coefficients. For the description of the formulation of the mathematical model given below, a profit maximization model is assumed. The process of developing similar models with different objective functions, e.g., minimize the amount of capital required to generate a given amount of income, would be similar.

Decision variables ($x_j$) represent crop programs selected by the user in FIG. 5. Additional decision variables are created for each production contract. Objective function and objective function coefficients ($c_j$) represent the seasonal profit potential per acre for each decision variable. Objective function coefficients are linked to decision variables. For the profit maximization model, these coefficients are computed as expected (per acre) crop revenue minus production costs. Per acre crop revenue is an estimated unit market price multiplied by an estimated yield. Production costs are an aggregation of all variable costs associated with planting, nurturing, harvesting, and selling a specific crop. Production costs may vary for a given field or a given season; these variances are accounted for as shown in FIG. 13 whereby variable costs are dependent upon a particular field. The summation of the product of objective function coefficients and decisions variables form the mathematical model objective function.

Constraints define the feasible region of the decision space. Constraints tend to limit what would otherwise be infinite combinations of crops and acreage over multiple seasons. Constraints are implicitly formulated for capital and land. The program formulates additional constraints, such as secondary resources and minimum and maximum acreage, based on data input in FIGS. 8–11. Each constraint consists of decision variables, constraint coefficients, an inequality or equality signs, and RHS values. Constraints are the summation of the product of the crop and field-specific constraint coefficient and the decision variable.

Constraint coefficients ($a_{ij}$) are a measure of resource consumption. Alternatively, they can represent the contribution of each resource to a measurable output. Constraint coefficients for land (whether it be the land constraint or acreage limits) are (by default) one. Constraint coefficients for capital are the variable production costs. Constraint coefficients for other constraints are explicitly entered as previously shown in FIG. 12. Constraint coefficients are linked to decision variables.

Inequality or equality signs (<,=,>) are derived from the nature of the constraint. For example, to prevent generating a solution which exceeds availability of a given resource, constraints of the type "less than or equal to", are used. Minimum acreage constraints are often of the type "greater than or equal to." Similarly, other constraints with equality or inequality signs may be generated to represent the objectives and other management preferences of the user.

Right side ($b_i$) values represent farm resource limitations—minimum or maximum values that solution must satisfy. Each constraint has a right side value.

Decision variables, objective function coefficients, constraint coefficients, inequality or equality signs, and right side values are gathered from the database by the business components and stored in the file format that is compatible with the particular mathematical programming algorithm used. This process formulates the objective function and constraints that comprise the mathematical representation of the farming enterprise.

The profit maximization objective function is formulated by linking decision variables with objective function coefficients that represent the potential profit per acre for each decision variable as shown in the equations below:

Objective Function for Linear Model:

Profit for each crop=[(price*yield)/acre−costs/acre]*no. of acres therefore the objective function to be maximized is represented as:

$$\text{Max } Z \sum c_j y_j x_j - p_j x_j$$

where $c_j$=price/unit and $y_j$=yield/acre for crop $x_j$ and $p_j$=production costs/acre for crop $x_j$ Objective Function for Integer Model:

Profit for each crop=[(price*yield)/acre−costs/acre]*no. of acres*$z_{in}$ where $z_{in}$ is a binary variable (1,0) representing plant crop i in field n therefore the objective function to be maximized is represented as:

$$\text{Max } Z \sum [c_j y_j x_j - p_j x_j] * z_m$$

where $c_j$=price/unit and $y_j$=yield/acre for crop $x_j$ and $p_j$=production costs/acre for crop $x_j$ Constraints are formulated by linking decision variables with constraint coefficients, inserting an equality or inequality sign (depending upon the nature of the constraint) and inserting the right side value. For example:

Land Constraint for Linear Model:

acres crop $1*z_{1n}$+acres crop $2*z_{2n}$+ . . . acres crop $n*z_{3n}$<=available acres e.g., $\Sigma x_1*z_{1n}+x_2*z_{2i}+ \ldots x_n*z_{3n}<=b_{land}$ Land Constraint for Integer Model:

acres crop 1+acres crop 2+ . . . acres crop $n$<=available acres e.g., $\Sigma x_1+x_2+ \ldots x_n<=b_{land}$ Capital Constraint for Linear Model:

production costs crop $1*z_{1n}$+productions costs crop $2*z_{2n}$+production costs crop $n*z_{in}$<=available capital e.g., $\Sigma p_1 x_1*z_{1n}+p_2 x_2*z_{2n}+ \ldots p_n x_n*z_{nn}<=b_{capital}$ As previously shown, land and capital are the base constraints that are always present. Additional constraints are formulated as necessary.

The generic form of the profit maximization model is:

$$\text{Max } Z \sum c_j y_j x_j - p_j x_j$$

such that:

$\Sigma a_{ij} x_j + a_{ij} x_j + \ldots a_{ij} x_n <= b_i$ for each $i$

The objective function includes decision variables for each crop in each year. If there are six crops under consideration and two years in the planning period, there are twelve (6×2=12) decision variables. If the problem is broken down by fields, each potential crop assignment to a specific field in a given year generates a decision variable.

After the model has been constructed, i.e., coefficients calculated and stored as new variables or the locations of parameters used to formulate the coefficients are stored, equations that comprise the model are imported into a mathematical optimization algorithm and the model is analyzed. In the profit maximization model example, the algorithm's solution identifies the most profitable assignment of crops to acres (or fields) that meets all of the specified constraints. FIGS. 16 and 17 show tabular and graphical representations of an optimized production planning scenario. In addition, during the analysis important sensitivity analysis parameters are generated. As illustrated in FIG. 19, different scenarios can be displayed for comparison purposes.

If the model cannot identify an assignment of crops to acres (or fields) that meets all the constraints, an infeasible problem exists and no solution is generated.

Whether an optimized scenario is generated or an infeasible solution exists the user can, via the interface shown in FIG. 15, modify any model parameter and reanalyze the model.

Sensitivity analysis is a key component in developing cropping scenarios. It is this process that helps the user to quickly formulate and identify optimal crop selections, acreage allocations, and resource usage tradeoffs that balance the multiple farming objectives of profit maximization, risk minimization and stewardship.

Output from the analysis algorithm include the optimal solution, slack variables, ranges for slack variables, basic variables, shadow prices and cost coefficients' upper and lower bounds. These parameters have important implications for performing "What if?" analyses on controllable decisions (such as rotations and contracting) and uncontrollable variables (such as price and yield forecasts).

As shown in FIG. 1, sensitivity analysis is first performed on controllable decisions 102, Step 2a (i.e., actionable decisions under the user's control) represented by RHS values. These can be varied (i.e., increased or decreased) by the user or automatically adjusted by specifying minimum and maximum values and/or increments of change. Implicit or explicit decision rules are used to systematically vary model based upon shadow prices and/or pre-programmed parametric functions. This capability streamlines the analysis process by eliminating most manual modifications. Additional manual sensitivity analysis can be performed by changing rotation options and production contracts and contract parameters. After modifying model parameters, the new model is stored in the database and re-analyzed. The user can then elect to continue with sensitivity analysis of controllable decisions or move on to determining the preferred scenarios' sensitivities to variations in crop prices, crop yields, and production costs 104, Step 2b.

FIG. 1 additionally illustrates the second phase of sensitivity analysis, i.e., how variations in uncontrollable assumptions such as crop prices, yields and production costs could affect each scenario. The algorithm of the present invention provides upper and lower bounds for each decision variable at which point the optimal scenario solution will change. This information can be used to determine the likelihood (given historic or forecasted price and yield information) of the optimal planning scenario still being the most profitable scenario given variability in crop prices, yields and production costs. For example, if the optimal scenario has 200 acres of cotton and the lower bound objective function cost coefficient is 1% of the original value, a decrease of 1% (based on a combination of price, yield and/or production costs) will decrease the acreage allocated to cotton. By decomposing the objective function coefficient (into elements of price, yield and production costs) for sensitive decision variables closer evaluation of the sensitivity of these assumptions can be performed in order to further reduce volatility and risk. This capability provides the user insight into the potential volatility of the optimal solution and implicit guidance on what crop programs should be further evaluated prior to selection of a final production plan.

FIG. 18 illustrates an example of a two-dimensional trade space generated by automated sensitivity analysis of a constraint's RHS value. Trade space is an abstraction of a bounded region that represents all combinations of the dependent variable based on combinations of independent variables. A multi-dimensional trade space refers to a trade space involving more than one independent variable. These types of graphs are displayed to the user. The user can "mouse click" on any part of the graph and the program will generate a "window" (not shown) that displays the cropping strategy including acreage allocations, objective function values, and resource consumption. The independent axes of the trade space shown in FIG. 18 (as reference numerals 52 and 54) can be instantly changed by the user to illustrate the relationships between the objective function and any combination of controllable resource constraints.

The user can interactively slice the three-dimensional trade space into a production curve which represents holding one controllable resource variable constant while varying another. This allows the user to more closely examine the marginal returns for a particular resource. The user can visually interact with these graphs to further manipulate farm model parameters to perform "what-if" queries by extending the trade space beyond the displayed parameters or parametrically altering model parameters specified amounts. Within seconds, the algorithm can analyze several thousand variations of the farm model to generate multidimensional trade spaces mathematically representative of the farming operation opportunity space. This trade space can be further modified by the user via a control panel of commands that allow the user to randomly or systematically examine the effects of altering any controllable resource. Thus, the present invention provides a means for the user to visualize and interactively alter model parameters to evaluate alternative farm resource allocation scenarios using a linear or an integer programming model integrated with parametric programming and with real-time multidimensional trade space analyses and graphics generation.

In summary, the first phase of the sensitivity analysis process defines a method for use of a system of software, hardware and business processes for allocating physical farm resources using one or more of the following techniques: linear, integer, mixed integer programming and parametric programming algorithms. Use of the techniques helps to generate cropping strategies, acreage allocations and resource management strategies to identify trade-offs in the objectives. Preferably, the method used in the first phase of the sensitivity analysis comprises one or more of the following steps:

(a) prescribing a model with an objective function and a plurality of constraints which adequately describes feasible allocations of said physical resources;

(b) identifying a tentative physical resource allocation which is strictly feasible;

(c) iteratively improving said tentative resource allocation by altering said tentative resource allocations in the direction specified by said objective function and said farming objectives; and (d) identifying said allocations and communicating said allocations to the user.

The second phase of the sensitivity analysis process deals with uncertainties inherent in crop prices, crop yields and crop production costs. Each scenario has a defined risk profile that includes parameters such as its potential profit given a specific set of crop prices, yields and production costs. The objective function's sensitivities of decision variable are identified via crop sensitivity bounds either predetermined or evaluated manually by the user.

User-driven sensitivity analysis can also be accomplished to further understand risk. This method allows the user to generate and evaluate risk scenarios for any cropping scenario. For example, the user can examine the impact of low wheat prices, the effects of drought that impact yield, quality and water consumption, or the impact of blight that could increase production costs and adversely affect yield and/or quality. Common scenarios such as these can be examined as well as any other scenario, since the user can individually or simultaneously alter price, yield and production cost parameters for any crop or combination of crops to represent the risk condition.

Forward contracting of crops is another risk reduction strategy that the present invention can help the user evaluate. In forward contracting, the market price for a crop is determined prior to planting or harvesting. Thus, a user can input the proposed contract price for a given crop and compare this with the forecast market price. Scenarios can be run for each case and the user can determine if the contract is reasonable by comparing changes in profit and other objectives.

Similarly, with forward contracting, the present invention can help the user evaluate the impact of other risk reduction strategies including participating in Government farm programs or purchasing commodity futures options. These strategies are only applicable for certain crops. The user can input information on farm program parameters that may affect the objective function coefficients and the certainty of these coefficients (price and yield). Also acreage restrictions can be incorporated and constraints generated. Scenarios can be analyzed which compare the returns from participating or not participating in the program. Risk hedging strategies from futures options can be developed by the system by determining the total return from the crop and the futures option given varying degrees of hedging, acreage to plant, and pricing scenarios.

In summary, the second phase of sensitivity analysis process defines a method for deploying a system for optimizing farm resources comprising assigning farming resources to specific crop enterprises in combination with identifying and quantifying risk factors affecting the stability of optimal solutions of crop selection, acreage allocation and resource management strategies and evaluating variations in crop prices, crop yields or production costs for each assignment. Preferably, the method comprises one or more of the following steps:

(a) determining the sensitivity of said optimal scenarios to variations in crop prices;

(b) determining the sensitivity of said optimal scenarios to variations in crop yields; and (c) determining the sensitivity of said optimal scenarios to variations in production costs.

In addition, this aspect of the sensitivity analysis process further defines a method that comprises one or more of the following:

(a) evaluating the advantages and disadvantages of forward contracting for a given crop within a cropping strategy;

(b) evaluating participation in government farm programs for a given cropping strategy and for determining the sensitivity of said optimal scenarios given participation in government farm programs; and (c) evaluating the use of commodity futures and commodity futures options for a given cropping strategy and for mitigating the sensitivity of variations in price, yield, or production costs on said optimal scenarios through the use of commodity futures and commodity futures options hedging strategies.

Figure 20:
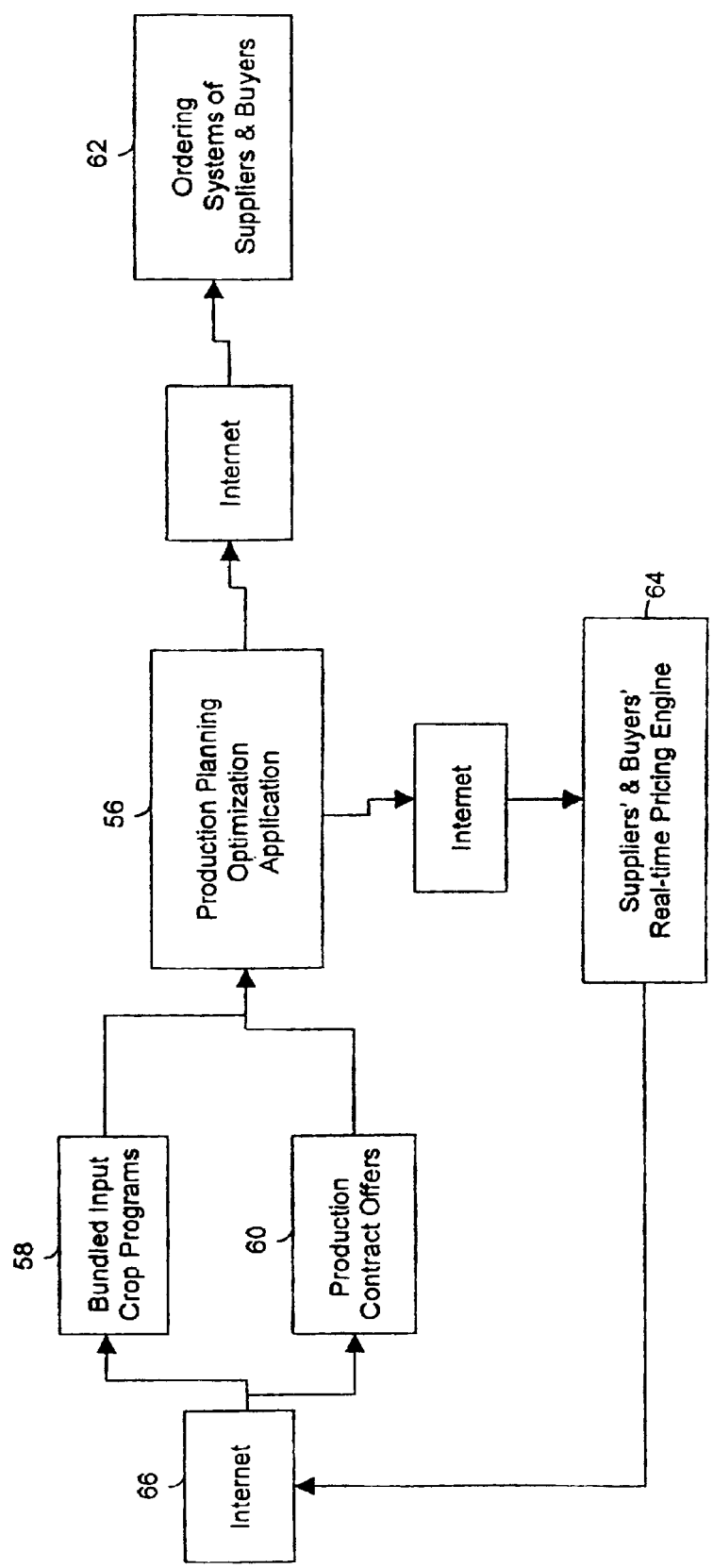
FIG. 20 illustrates a flow chart for a method to utilize real-time pricing and price discovery during the system of FIG. 1, made in accordance with the present invention.

As illustrated in FIG. 20, the present invention additionally provides the capability to link the production planning analysis 56 with real-time input bundling 58 (e.g., seed, crop protection chemicals, insurance, loans) and contract pricing 60, as well as to automatically generate an electronic order 62 as an outcome of the production planning analysis.

In addition to input bundles, a production contract 60 may be included in the bundle such that the purchase of the crop is linked to the products used to produce the crop. These product bundles have associated variable production costs and estimated revenues (the product of price and yield) as well as unique crop price and yield variances. Therefore, each bundle (called crop programs) 58 comprises unique decision variables in the production planning mathematical optimization algorithm.

The decision variables for these bundles, consisting of one or more of the following: product brand names, prices and quantities and production contracts, once selected by the production planning optimization algorithm, generate an explicit bill of materials or product order, and may be transmitted (electronically via the Internet 66 or other private network) to the suppliers' and buyers' real-time pricing engines 64. This order specifies the name brand of the product, the quantity required, the unit price and the total price by line item.

The compilation of these itemized inputs (i.e., a product order) is sent electronically (via the Internet 66 or a private network) to an input supply or product manufacturer's electronic or manual order fulfillment system. Similarly, a commitment to execute one or more production contracts can be sent electronically to the buyer. Similarly a formal request for an operating loan can be sent electronically to the lender. Also, if necessary, an agreement to purchase crop insurance can be sent electronically to the crop insurance agent or underwriter.

This system allows for the two-way real-time communication between the farmer generating an optimal custom farm management plan, and the third party industry professionals that can provide the data and information to optimize that plan.

As has been illustrated, the method of the present invention described above can be useful in identifying cropping scenarios that optimize utilization of controllable farm resources such as land, capital, labor, water, machinery and chemicals in order to maximize farm profit or minimize resource use, and then minimize risk by identifying uncontrollable variables and alternative cropping strategies that are insensitive to these uncontrollable variables such as crop prices, yields and production costs. Furthermore, the present invention permits the user to quickly determine key production management information such as for example: the most profitable combinations of crops and acreage to maximize profits and minimize risk based on management objectives such as profit maximization, risk affect profits from stewardship; how profits from different cropping minimization, and variances in prices, yields, and production costs could strategies are impacted by varying inputs such as capital, acreage, labor, water, machinery, etc.; the costs versus benefits of risk management strategies such as diversification, commodity futures options, forward contracting and farm program participation; effects on profits of growing vs. buying feed; and the effect of more or less acreage on profits, the amount of land to lease, and its production value.

The present system can also be configured such that the farmer or user of the system has the capability of allowing one or more third party industry professionals or sources, as defined above, to access the information that the user has entered into the system. Otherwise, security measures, as known by those having ordinary skill in the art, can be implemented to prohibit such access.

Although the description above contains many specifics, these should not be construed as limiting the scope of the invention but as merely providing illustrations of some of the presently preferred embodiments of this invention. For example, other resources such as fuel or seed could be used to build constraints. Also, the method can be applied to multiple farming operations or utilized simultaneously by multiple users via a computer network server. Thus the scope of the invention should be determined by the appended claims and their legal equivalents, rather than by the examples given.

What is claimed is:

1. A method for developing a custom farm management plan for production agriculture pertaining to a farm, comprising the steps of:

obtaining input information pertaining to a farm from a user via an electronic communications network, the input information defining at least one cropping strategy;

obtaining third-party financial information comprising at least crop production cost data and crop market price data;

analyzing said input information, on a computer, pertaining to said farm and said third-party financial information in accordance with a mathematical model having an objective function for profit maximization bounded by resource constraints consistent with the defined cropping strategy; and maximizing the objective function to generate a corresponding first custom farm management plan based on said input information and said third-party financial information, the objective function indicative of a corresponding economic performance of the farm for display or provision to said user, wherein the objective function is expressed as the following representation:

$$\text{Max } Z \ \Sigma c_j y_j x_1 - p_j x_1,$$

where Max Z represents a maximization function, $c_j$ is the price/yield unit, $y_j$ is the yield/acre for crop identifier j, $x_j$ represent a crop program variable for crop identifier j, and $p_j$ is production costs/acre for crop identifier j.

2. The method according to claim 1 wherein said custom farm management plan for production agriculture comprises at least one of a graphical display and a tabular display of crop selection and allocation of farm resources for seasonal or multi-seasonal cropping strategies.

3. The method according to claim 2 wherein said farm resources comprise one or more of the following: capital, land, labor, machinery, crop storage, irrigation system capacity, water rights, and nutrient loading.

4. The method according to claim 1 wherein said input information pertaining to said farm is at least one farm management preference selected from the group of agronomic, operational and physical farm information.

5. The method according to claim 1 wherein the third-party financial information is selected from the group of seed prices, fertilizer prices, production contracts, agriculture insurance rates, agriculture marketing information, agriculture consultant's information, agriculture accounting information, and lender's interest rates.

6. The method according to claim 1 further comprising the step of performing an iterative process to determine at least one additional farm management plan, wherein said iterative process comprises modifying at least one controllable variable associated with the mathematical model, said at least one controllable variable selected from the group of crop programs, crop rotation patterns, different amounts of production contracts, different types of production contracts, and crop insurance.

7. The method according to claim 6 wherein said iterative process comprises modifying at least one uncontrollable variable of said mathematical model, said at least one uncontrollable variable selected from the group of crop prices, yields and production costs.

8. The method according to claim 6 wherein said user selects a desired farm management plan that meets desired goals from the first farm management plan and the at least one additional farm management plan.

9. The method according to claim 8 wherein said user compares between the first farm management plan and the at least one additional farm management plan based on gross income, downside risk, opportunity cost risk and resource use.

10. The method according to claim 8 wherein said desired farm management plan is determined from profit maximization, risk minimization, resource minimization, and environmental stewardship.

11. The method according to claim 1 wherein resource constraints are expressed as the following equation:

$$\Sigma\ a_{ij}x_j + a_{ij}x_j + \ldots a_{ij}x_n <= b_i \text{ for each } i$$

where $a_{ij}$ is a constraint coefficient that represents a measure of resource consumption of resource i, for crop identifier j, where $x_j$ represent crop program variable, where $b_i$ represent a maximum farm resource limitation for resource i, where j ranges from 1 to n.

12. The method according to claim 1 wherein the resource constraints are expressed as the following representation of a land constraint:

$$\Sigma x_1 * z_{1n} + x_2 * z_{2n} + \ldots x_n * z_{jn} <= b_{land},$$

wherein $x_1$ represents total acres of crop 1, $x_2$ represents total acres of crop 2 up to $x_n$ representing total acres of crop n, where $z_{in}$ is a binary variable with a value of 0 or 1, representing the presence or absence of a planted crop i in field n, where $b_{land}$ represents available acres.

13. The method according to claim 1 wherein the resource constraints are expressed as the following representation of a land constraint:

$$\Sigma x_1 + x_2 + \ldots x_n <= b_{1and}$$

wherein $x_1$ represents total acres of crop 1, $x_2$ represents total acres of crop 2 up to $x_n$ representing total acres of crop n, where $b_{land}$ represents available acres.

14. The method according to claim 1 wherein the resource constraints are expressed as the following representation of a land constraint:

$$\Sigma p_1 x_1 * z_{1n} + p_2 x_2 * z_{2n} + \ldots p_n x_n * z_{nn} <= b_{capital},$$

wherein $x_1$ represents total acres of crop 1, $x_2$ represents total acres of crop 2 up to $x_n$ representing total acres of crop n, wherein $p_1$ represents total production cost of crop 1, $p_2$ represents total production cost of crop 2 up to $x_n$ representing total production cost of crop n, where $z_{in}$ is a binary variable with a value of 0 or 1, representing the presence or absence of a planted crop i in field n, where $b_{capital}$ represents available capital and $z_{nn}$ is the value of $z_{in}$ for field n.

15. A method for developing a custom farm management plan for production agriculture pertaining to a farm, comprising the steps of:

obtaining input information pertaining to a farm from a user via an electronic communications network, the input information defining at least one cropping strategy;

obtaining third-party financial information comprising at least crop production cost data and crop market price data;

analyzing said input information, on a computer, pertaining to said farm and said third-party financial information in accordance with a mathematical model having an objective function for profit maximization bounded by resource constraints consistent with the defined cropping strategy; and maximizing the objective function to generate a corresponding first custom farm management plan based on said input information and said third-party financial information, the objective function indicative of a corresponding economic performance of the farm for display or provision to said user, wherein the objective function expressed as the following representation:

$$\text{Max } Z\Sigma[c_j y_j x_j - p_j x_j] * z_{in},$$

where Max Z represents a maximization function, $c_j$ is the price/yield unit, $y_j$, is the yield/acre for crop identifier j, $x_j$ represent a crop program variable for crop identifier j, and $p_j$ is production costs/acre for crop identifier j, and where $z_{in}$ is a binary variable with a value of 0 or 1, representing the presence or absence of a planted crop i in field n.

16. A system for developing a custom farm management plan for production agriculture pertaining to a farm, comprising the steps of:

a first module for obtaining input information pertaining to a farm from a user via an electronic communications network, the input information defining at least one cropping strategy;

a second module for obtaining third-party financial information comprising at least crop production cost data and crop market price data;

a third module for analyzing said input information pertaining to said farm and said financial information in accordance with a mathematical model having an objective function for profit maximization bounded by resource constraints consistent with the defined cropping strategy; and a fourth module for maximizing the objective function to generate a corresponding first custom farm management plan based on said input information and said third-party financial information, the objective function indicative of a corresponding economic performance of said farm for display or provision to said user, wherein the objective function is expressed as the following representation:

$$\text{Max } Z\ \Sigma c_j y_j x_j - p_j x_j,$$

where Max Z represents a maximization function, $c_j$ is the price/yield unit, $y_j$ is the yield/acre for crop identifier j, $x_j$ represent a crop program variable for crop identifier j, and $p_j$ is production costs/acre for crop identifier j.

17. The system according to claim 16 wherein the resource constraints are expressed as the following equation:

$$\Sigma a_{ij}x_j + a_{ij}x_j + \ldots a_{ij}x_n <= b_i \text{ for each } i$$

where $a_{ij}$ is a constraint coefficient that represents a measure of resource consumption of resource i, for crop identifier j, where $x_j$ represent crop program variable, where $b_i$ represent a maximum farm resource limitation for resource i, where j ranges from 1 to n.

18. The system according to claim 16 wherein the resource constraints are expressed as the following represontation of a land constraint:

$$\Sigma x_1 * z_{1n} + x_2 * z_{2n} + \ldots x_n * z_{jn} <= b_{land},$$

wherein $x_1$ represents total acres of crop 1, $x_n$ represents total acres of crop 2 up to $x_n$ representing total acres of crop n, where $z_{in}$ is a binary variable with a value of 0 or 1, representing the presence or absence of a planted crop i in field n, and where $b_{land}$ represents available acres.

19. The system according to claim 16 wherein the resource constraints are expressed as the following represontation of a land constraint:

$$\Sigma x_1 + x_2 + \ldots x_n <= b_{land},$$

wherein $x_1$ represents total acres of crop 1, $x_2$ represents total acres of crop 2 up to $x_n$ representing total acres of crop n, where $b_{land}$ represents available acres.

20. A system for developing a custom farm management plan for production agriculture pertaining to a farm, comprising the steps of:

a first module for obtaining input information pertaining to a farm from a user via an electronic communications network, the input information defining at least one cropping strategy;

a second module for obtaining third-party financial information comprising at least crop production cost data and crop market price data;

a third module for analyzing said input information pertaining to said farm and said financial information in accordance with a mathematical model having an objective function for profit maximization bounded by resource constraints consistent with the defined cropping strategy; and a fourth module for maximizing the objective function to generate a corresponding first custom farm management plan based on said input information and said third-party financial information, the objective function indicative of a corresponding economic performance of said farm for display or provision to said user, wherein the objective function is expressed as the following representation:

$$\text{Max } Z \Sigma [c_j y_j x_j - p_j x_j] * z_{in}$$

where Max Z represents a maximization function, $c_j$ is the price/yield unit, $y_j$ is the yield/acre for crop identifier j, $x_j$ represent a crop program variable for crop identifier j, and $p_j$ is production costs/acre for crop identifier j, and where $z_{in}$ is a binary variable with a value of 0 or 1, representing the presence or absence of a planted crop i in field n.

* * * * *